United States Patent [19]

Mullis

[11] 3,865,130
[45] Feb. 11, 1975

[54] LOCK VALVE
[75] Inventor: Jerry D. Mullis, Monroe, N.C.
[73] Assignee: Consolidated Brass Company, Matthews, N.C.
[22] Filed: Dec. 26, 1973
[21] Appl. No.: 428,076

[52] U.S. Cl.............. 137/385, 70/180, 70/203, 251/288, 251/292
[51] Int. Cl............................................. F16k 35/00
[58] Field of Search...... 137/383, 385; 70/180, 203, 70/210; 251/288, 292

[56] References Cited
UNITED STATES PATENTS
1,014,203   1/1912   Bees............................... 137/385 X Primary Examiner—Henry T. Klinksiek
Attorney, Agent, or Firm—Richards, Shefte & Pinckney

[57] ABSTRACT

A flow-control valve having a valve member operated by a rotatable handle, the handle being selectively lockable to an extending portion of the valve casing at either the open or closed position of the valve member, and being selectively removable from the valve casing. The extending portion of the valve casing is a U-shaped locking post having extending legs with aligned openings therein, and the valve handle includes a locking plate portion having two locking projections each formed with an opening therein and an intermediate removal recess, the valve handle being rotatable between a first valve open position at which one of the locking projections is within the U-shaped locking post legs with the opening therein aligned with the locking post leg openings, a valve closed position at which the other locking projection is within the locking post legs with similarly aligned openings, and an intermediate removal position at which the locking plate portion is clear of the locking post to permit removal of the locking handle. Preferably, the locking plate portion of the valve handle also includes a stop disposed adjacent each locking projection for abutting the locking post at the valve open and valve closed positions of the valve handle, respectively, for accurately positioning the valve handle with respect to the locking post.

3 Claims, 5 Drawing Figures

PATENTED FEB 11 1975   3,865,130

LOCK VALVE

BACKGROUND OF THE INVENTION

In some fluid-flow systems, the operating position of a particular regulating valve may be critical to the proper functioning of the system, and the improper operation or positioning of such a valve can result in a complete malfunction of the system, often with serious and dangerous consequences. For this reason, it is often desirable to provide fluid-flow valves which can be securely locked at one or more operating positions thereof to prevent tampering with the valve, and to prevent unauthorized or inadvertent operation of the valve.

There are a variety of prior art lock valve proposals, such as disclosed for example in U.S. Pat. Nos. 2,748,589, issued June 5, 1956; 2,271,475, issued Jan. 27, 1942; and 1,495,630, issued May 27, 1924; which generally include a plate that is turnable with the operating valve handle and that have openings formed therein that will be aligned with corresponding openings in flat portions of the valve casing at predetermined positions of the valve handle whereby a padlock or similar locking device can be placed through such aligned openings to lock the valve handle in place at these predetermined positions. However, valves of this type often include relatively complex and expensive mechanical arrangements for maintaining the valve handle in place as it shifts between selected positions thereof and for stopping the valve handle precisely at such selected position, and it is often difficult to remove the valve handle when, for example, the valve is serviced.

In accordance with the present invention, a valve is provided with a lockable valve handle that is reliable and extremely simple to produce, and that can be quickly and easily manipulated between a plurality of selected locking positions as well as a position at which the valve handle can be readily removed.

SUMMARY OF THE INVENTION

The lockable valve of the present invention includes a valve casing having a valve member movable therein, the valve casing being formed with a U-shaped locking post extending therefrom to present spaced leg portions having aligned lock receiving openings therein. A valve handle is associated with the valve member for moving it between open and closed dispositions, and this handle includes a locking plate portion formed with first annd second locking projections, each having an opening therein, and a removal recess extending between these first and second projections.

The valve handle is mounted on an operating shaft that is connected to the valve member and that extends outwardly from the valve casing, and the valve handle is selectively shiftable between a first position at which the valve member is at its open disposition and one locking projection is positioned between the leg portions of the locking post with the opening in such locking projection aligned with the aligned openings in the locking post leg portions, a second position at which the valve member is at its closed disposition and the other locking projection is located between the locking post leg portions with the opening in such other locking projection being aligned with the aligned openings in the locking post leg portions, and a third position intermediate the aforesaid first and second positions, at which the removal recess in the locking plate portion is disposed adjacent the locking post but beyond the extent of one of the locking post legs whereby the locking plate portion is clear of the locking post to permit removal of the valve handle.

Preferably, each of the locking projections has associated therewith a stop portion located at the side thereof that is opposite to the side at which the removal recess is located, these stop portions being arranged to abut the locking post at the aforesaid first and second positions of the valve handle, respectively. The positional relationship between each locking projection and its associated stop portion is such that when a stop portion abuts the locking post, its associated locking projection will be accurately positioned between the leg portions of the locking post.

Finally, the locking plate portion of the valve handle is disposed in a plane lying in perpendicular relation to the extending valve operating shaft, and the leg portions of the U-shaped locking post extend toward such operating shaft in parallel relation to the plane of the locking plate portion on each side thereof respectively, whereby the locking arrangement for the valve can be easily formed and mounted thereon.

DESCRIPTION OF THE ACCOMPANYING DRAWINGS

DESCRIPTION OF THE PREFERRED EMBODIMENTS

Figure 1:
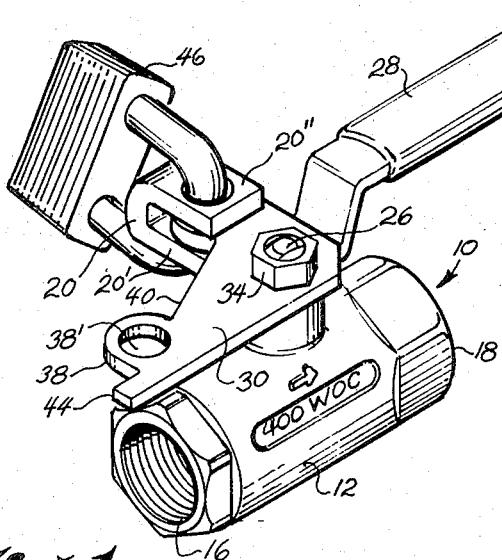
FIG. 1 is a perspective view of the lockable valve of the present invention.

Looking now in greater detail at the accompanying drawings, FIGS. 1-5 illustrate a valve 10 that includes a valve casing 12 in which a conventional ball valve member 14 is rotatable between a first open disposition at which fluid communication is established between the valve inlet 16 and the valve outlet 18, and a second closed disposition at which such fluid-communication is prevented. It is to be understood that the valve 10 illustrated in the drawings is merely representative of a large variety of fluid valves having handle operated valve members which could be adapted to incorporate the locking features of the present invention.

Figure 2:
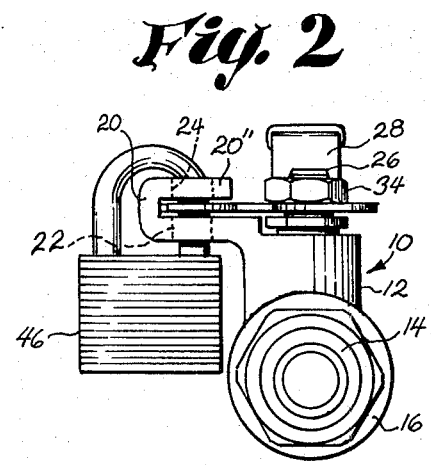
FIG. 2 is a front elevational view of the valve shown in FIG. 1.

As best seen in FIGS. 1 and 2, the valve casing 12 has integrally formed therewith a U-shaped locking post 20 which is relatively narrow, yet sturdy, and which includes a first leg portion 20' that extends to an integral connection with valve casing 12 and a second leg portion 20'' which extends toward the valve casing 12 in spaced, parallel relation to the first leg portion 20'. The first and second leg portions 20', 20'' are provided with aligned openings 22, 24, respectively, therein.

The valve member 14 is connected to an operating shaft 26 which extends outwardly from the valve casing 12, and a valve handle 28 is mounted on the operating shaft 26. The valve handle 28 includes a generally flat locking plate portion 30 formed with a rectangular mounting aperture 32 (see FIG. 5) that slides onto the extending end of the operating shaft 26 where flat faces are provided for engaging the rectangular aperture 32, and a nut 34 is then threadably mounted onto the extending end of the operating shaft 26 to hold the valve handle 28 in place thereat.

The flat locking plate portion 30 of the valve handle 28 is additionally formed with two locking projections 36, 38 separated by a removal recess 40, the locking projections 36, 38 having openings 36', 38' provided, respectively, therein. A first extending stop portion 42 is located adjacent the locking projection 36 on the opposite side thereof with respect to the removal recess 40, and a similar second extending stop portion 44 is located in like manner adjacent the other locking projection 38.

When the valve handle 28 is mounted on the operating shaft 26 as described above, the flat locking plate portion 30 is disposed in a plane that lies in perpendicular relation to the operating shaft 26 and that lies in parallel relation to the first and second leg portions 20', 20" of the locking post 20, intermediately thereof.

Figure 3:
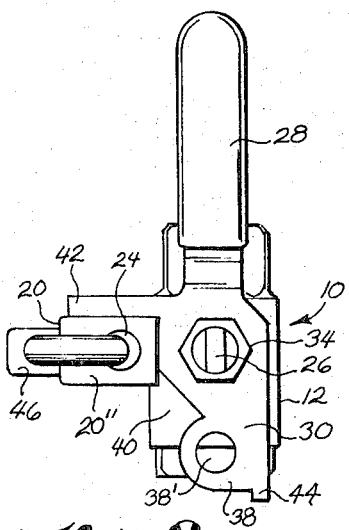
FIG. 3 is a plan view of the valve shown in FIG. 1, illustrating the valve handle at one operating position thereof.
Figure 4:
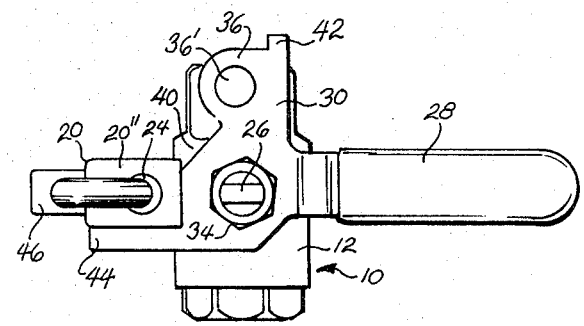
FIG. 4 is a plan view similar to FIG. 3 and illustrating the valve handle at a second operating position thereof.
Figure 5:
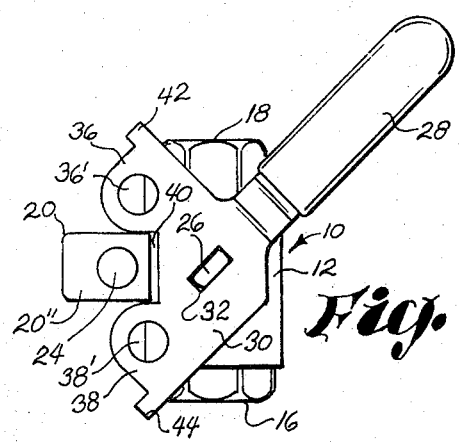
FIG. 5 is a plan view similar to FIG. 3 and illustrating the valve handle at the removal position thereof.

The three operative positions of the valve handle 28 are illustrated in FIGS. 3–5. In FIG. 3, the valve member 14 is at its aforesaid open disposition, and it will be noted that the first stop 42 is in abutment with the curved wall of locking post 20. The relationship between the first stop 42 and the first locking projection 36 is such that when the first stop 42 abuts the locking post 20 as seen in FIG. 3, the first locking projection 36 will be disposed between first and second leg portions 20', 20" of the locking post 20 with the opening 36' in the first locking projection 36 precisely aligned with the aligned openings 22, 24 in the first and second leg portions 20', 20" whereby the shackle of the padlock 46, or other equivalent locking apparatus, can be readily passed through the three aligned openings and secured in place thereat. It will be apparent that, with the padlock 46 in place and locked as shown in FIG. 3, the valve handle 28 cannot be moved and the valve member 14 will be securely held in its aforesaid open disposition.

When it is desired to move the valve member 14 to its closed disposition, the padlock 46 is unlocked and removed, and the valve handle 28 is turned in a clockwise direction until the second stop 44 engages the locking post 20 as seen in FIG. 4, whereupon the second locking projection 38 will be positioned between the first and second locking post legs 20', 20" with the second locking projection opening 38' precisely aligned with the openings 22, 24 in the locking post leg portions 20', 20". The padlock 46 may then be placed in the aligned openings 20', 20" and 38' and locked, and the valve member 14 will be secured in its closed disposition.

When it is necessary or desirable to remove the valve handle 28, the valve handle 28 is moved to its intermediate or removal position which is shown in FIG. 5 where the nut 34 has been removed for clarity. At this position of the valve handle 28, the removal recess 40 is disposed adjacent the locking post 20 with the locking projections 36, 38 disposed on each side thereof, and it will be observed that the removal recess 40 is beyond the extent of the second locking post leg portion 20" whereby the locking plate portion 30 is clear of the locking post and the valve handle 28 may be easily raised without interference from the locking post 20.

Thus, the valve handle 28 may be readily operated to position the valve member 14 in either selected disposition thereof, the stops 42 and 44 serving to position accurately the locking projections 36, 38 between the locking post legs 20' and 20" for locking at either disposition of the valve member 14 and the valve handle 28 can also be easily removed by placing it at its intermediate removal position. Moreover, at normal operating positions of the valve handle 28, the locking plate portion 30 thereof is maintained between the locking post legs 20' and 20" to prevent bending or similar tampering with the portion of the valve handle 28 at which the padlock 46 is placed. Finally, it is to be noted that the locking structure is quite simple and inexpensive to produce in that the locking post 20 is relatively narrow and small, and the locking plate portion 30 of the valve handle 28 is a flat piece which can be readily stamped or otherwise formed to include locking projections 36, 38, openings 36', 38', stops 42, 44 and removal recess 40.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. A flow-control valve including a valve casing having a U-shaped locking post extending therefrom to present spaced leg portions having aligned openings formed therein, a valve member movable within said valve casing between selected first and second dispositions thereof, and a valve handle associated with said valve member for moving said valve member between said selected dispositions thereof, said valve handle including a locking plate portion formed with first and second locking projections each having an opening therein and a removal recess extending between said first and second projections, and said valve handle being mounted for selective shifting between a first position at which said valve member is at said first disposition thereof and one of said locking projections is disposed between said leg portions of said locking post with the opening in said one locking projection being aligned with said aligned openings in said locking post leg portions, a second position at which said valve member is at said second disposition thereof and the other of said locking projections is disposed between said leg portions of said locking post with the opening in said other locking projection being aligned with said aligned openings in said locking post leg portions, and a removal position, intermediate said first and second positions, at which said removal recess of said locking plate portion is disposed adjacent said locking post and beyond the extent of one of said leg portions thereof whereby said locking plate portion is clear of said U-shaped locking post to permit removal of said valve handle.

2. A flow-control valve as defined in claim 1 and further characterized in that said valve handle locking plate portion is formed with a first extending stop portion located adjacent one of said locking projections on the opposite side thereof with respect to said removal recess in said locking plate portion, said first stop portion being arranged to abut said locking post at said first position of said valve handle, and a second extending stop portion located adjacent the other of said locking projections on the opposite side thereof with respect to said removal recess in said locking plate portion, said second stop portion being arranged to abut said locking post at said second position of said valve handle.

3. A flow-control valve as defined in claim 1 and further characterized in that said valve member is rotatable in said valve casing and includes an operating shaft extending outwardly from said valve casing for rotating said valve member, in that said valve handle is mounted on said operating shaft for rotating the same, in that said locking plate portion of said valve handle is disposed in a plane lying in perpendicular relation to said operating shaft, and in that the leg portions of said U-shaped locking post extend toward said operating shaft in parallel relation to the plane of said locking plate portion and on each side thereof, respectively.

* * * * *